United States Patent
Sherlock

[11] 3,902,787
[45] Sept. 2, 1975

[54] REAR PROJECTION VIEWING SCREEN
[75] Inventor: Hugh Paul Sherlock, Palo Alto, Calif.
[73] Assignee: Action Films, Inc., Mountain View, Calif.
[22] Filed: Apr. 17, 1974
[21] Appl. No.: 461,523

[52] U.S. Cl. .............................. 350/127; 350/128
[51] Int. Cl.² ........................................ G03B 21/60
[58] Field of Search ........................... 350/127, 128

[56] References Cited
UNITED STATES PATENTS
| | | | |
|---|---|---|---|
| 2,480,031 | 8/1949 | Kellogg | 350/127 |
| 2,726,573 | 12/1955 | Maloff | 350/127 |
| 3,712,707 | 1/1973 | Henkes, Jr. | 350/127 X |

*Primary Examiner*—Richard A. Wintercorn
*Attorney, Agent, or Firm*—Flehr, Hohbach, Test, Albritton & Herbert

[57] ABSTRACT

Rear projection viewing screen formed of a member of a transparent material and having first and second generally parallel surfaces. A light diffusing pigmentation in granular form is dispersed in the member with a substantially uniform distribution which serves to form nuclei to disperse light impinging upon the screen in a direction away from the first surface. A Fresnel type lens is formed on the first surface of the member so that the Fresnel type lens and the pigmentation formed in the material provide the viewing screen with a viewing surface on the second surface which provides an image which is formed on an axis in line with the viewer and which is bright and sharp throughout the viewing surface. The second surface may be formed with a matte finish to minimize reflections and glare.

5 Claims, 3 Drawing Figures

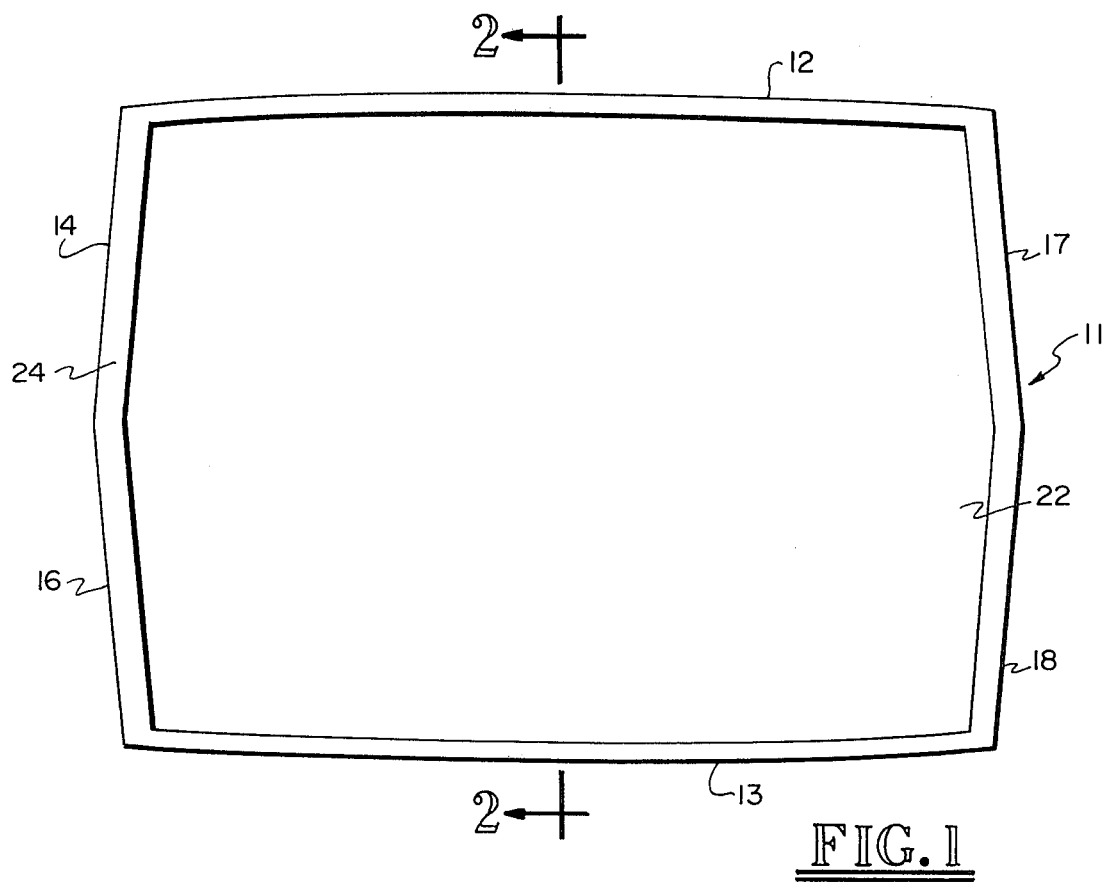
FIG. 1
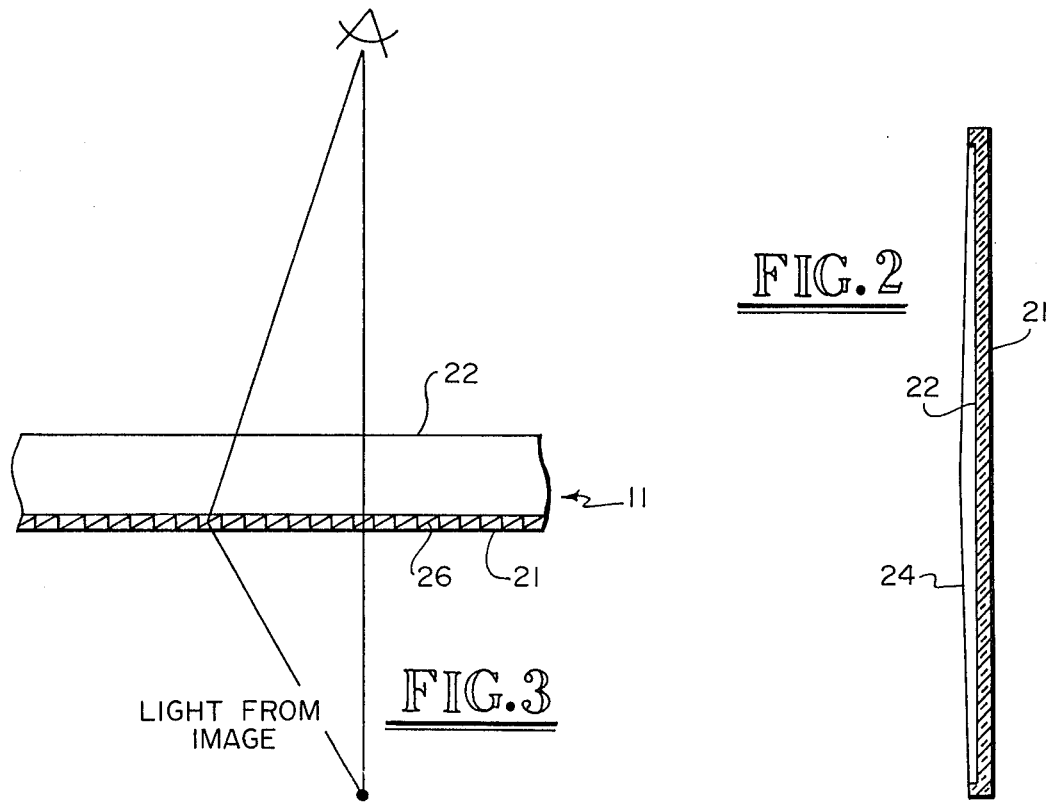
FIG. 2
FIG. 3
LIGHT FROM IMAGE

REAR PROJECTION VIEWING SCREEN

BACKGROUND OF THE INVENTION

Rear projection viewing screens have heretofore been provided. However, such screens have had certain undesirable features. For example, in certain of such screens there has been a degradation in the brightness directly related to the distance from the center of the screen. In addition, there has been a degradation in brightness directly related to the position of the viewer from the axis of the screen to provide what has been termed a "hot spot." In others, the light dispersing pigment is in a coating deposited on the surface of the screen, resulting in a significantly more costly and less durable screen. In others, light dispersing is caused by a substantially roughened surface on the screen which results in a granular appearing picture. In still others, the pigment is dispersed in the screen but there is no Fresnel lens to direct the light from the corners of the screen to the viewer. There is, therefore, a need for a new and improved rear projection viewing screen.

SUMMARY OF THE INVENTION AND OBJECTS

The viewing screen consists of a member formed of a transparent material and having first and second generally parallel surfaces. Pigmentation in granular form is disposed in the member and is distributed substantially uniformly throughout the same and serves to form nuclei to disperse light impinging upon the screen. A Fresnel-type lens is formed on the first surface of the member and in combination with the pigmentation serves to provide a bright and sharp image on the second surface which is substantially uniform throughout the area of the second surface.

In general, it is an object of the present invention to provide a rear projection viewing screen which has greatly improved viewing characteristics.

Another object of the invention is to provide a rear projection viewing screen of the above character which is low in cost.

Another object of the invention is to provide a rear projection viewing screen which has a more uniform brightness throughout the viewing area.

Another object of the invention is to provide a rear projection viewing screen of the above character which provides a sharp image at the viewing surface throughout the area of the viewing surface.

Another object of the invention is to provide a rear projection viewing screen of the above character which provides high contrast.

Another object of the invention is to provide a rear projection viewing screen of the above character which can be injection molded.

Another object of the invention is to provide a rear projection viewing screen of the above character which is durable.

Additional objects and features of the invention will appear from the following description in which the preferred embodiment is set forth in detail in conjunction with the accompanying drawing.

BRIEF DESCRIPTION OF THE DRAWING

FIG. 1 is a front elevational view of a rear projection viewing screen incorporating the present invention.

FIG. 2 is a cross-sectional view taken along the line 2—2 of FIG. 1.

FIG. 3 is a greatly enlarged view of a portion of the viewing screen as shown in FIGS. 1 and 2 and showing the manner in which it is used.

DESCRIPTION OF THE PREFERRED EMBODIMENT

As shown in FIGS. 1 and 2, the rear projection viewing screen consists of a member 11 formed of a transparent material. The member 11 has a desired configuration as, for example, substantially rectangular as shown. As can be seen, the member is provided with gently curved upper and lower edges 12 and 13 and side edges which are formed by side walls 14 and 16, and 17 and 18 respectively, which extend generally in straight lines and intersect at a mid-point along the side edge to form outwardly extending side edges. The member is also provided with first and second or front and rear surfaces 21 and 22 which are generally parallel with respect to each other. The member 11 is provided with a rim 24 formed integral therewith which extends around the outer perimeter of the member and faces forwardly from the front or second surface 22.

The member 11 is formed of suitable transparent material. One such material found to be particularly satisfactory is a plastic, GP Styrene with a pigmentation (e.g. Foster-Grant 6819 T50 with concentrate of B2822-595). It has been found that the smoke color is desirable because it is neutral and thus has the best effect for color pictures which are to be viewed on the screen.

The pigmentation in the member 11 is provided by a pigment mixture that includes a diffusing pigment which scatters or diffuses light and a light absorbing pigment to increase contrast. The general purpose Styrene is supplied in the form of pellets. The granular pigment is already dispersed in the Styrene base forming the plastic pellets. The ratio of plastic to pigmentation can vary from 1:1 to 20:1 with the desired ratio being approximately 15:1. The pellets are supplied to the dies of an injection molding machine to provide the desired members 11. The die is formed in such a manner that a Fresnel type lens is injection molded into the rear or first surface 21 of the member. The Fresnel lens, as is well known to those skilled in the art, is formed by providing grooves 26 in the first surface. The grooves 26 are formed in concentric circles starting from the center of the area of the first surface 21 and have a spacing which is preferably in excess of 150 grooves per inch to minimize striations as, for example, 150 grooves per inch. The grooves are formed in such a manner so that the Fresnel surface has a focal length ranging from 10 to 20 inches and preferably a focal length of approximately 12.5 inches.

The die is also formed in such a manner that a matte finish is provided on the second surface 22 of the member 11 to reduce glare and reflections.

By the use of injection molding, it can be seen that Fresnel lenses are formed on the first surface 21 and a matte finish on the second surface 22 of the member at the same time that the member is being formed from the plastic pellets. By the use of injection molding, the members or parts 11 can be formed very rapidly, particularly if a multi-cavity die is utilized. The second or front surface 22 is formed so that it is smooth with a matte finish.

Operation and use of the rear projection viewing screen can now be briefly described as follows. Let it be assumed that the rear projection viewing screen is to be utilized in a projector as described in copending application Ser. No. 410,819, filed Oct. 29, 1973. The image is projected onto the rear surface 21 as shown in FIG. 3. The Fresnel lens-type surface serves to form the image on the screen in such a manner that it is sharp throughout the entire area of the screen and gives the appearance of being formed about an axis which is coincident with the line of sight from the viewer to the front surface of the screen. This means that the image is uniformly sharp throughout the area of the front surface of the screen. In addition, the pigmentation which is substantially uniform is distributed throughout the member or part and serves to form little nuclei which disperse the light which is received by the screen.

Thus, it can be seen that there has been provided a viewing screen which can be produced relatively inexpensively. It has a durable front surface which is smooth and can be readily cleaned. The screen provides an image which has uniform brightness throughout the viewing area of the screen with high contrast.

By way of example, a screen incorporating this invention could have a size of approximately 6 inches by 4 inches and a thickness of approximately 0.1 inch.

I claim:

1. In a rear projection viewing screen, a member formed of a substantially transparent material having front and second generally parallel surfaces, a pigmentation in granular form in said member and dispersed substantially uniformly throughout the member and serving to form nuclei to disperse light impinging upon the screen, and a Fresnel-type lens formed in said member solely on said first surface by spaced grooves in excess of 100 per inch whereby said Fresnel lens surface and said pigmentation serve to provide a bright and sharp image on said second surface substantially throughout the entire area of said second surface.

2. A screen as in claim 1 wherein said Fresnel lens surface has a focal length ranging from 10 to 20 inches.

3. A screen as in claim 1 wherein said second surface is formed with a matte finish to reduce glare and reflections.

4. A screen as in claim 2 wherein said Fresnel lens surface has a focal length of approximately 12.5 inches.

5. A screen as in claim 2 wherein said Fresnel lens is formed by placing grooves in the first surface along concentric circles.

* * * * *